(12) United States Patent
Sorbera et al.

(10) Patent No.: US 12,500,251 B2
(45) Date of Patent: Dec. 16, 2025

(54) SYSTEMS AND METHODS FOR LIQUID HEATING BALANCE OF PLANT COMPONENTS OF A FUEL CELL MODULE

(71) Applicant: HYDROGENICS CORPORATION, Mississauga (CA)

(72) Inventors: Sonia Sorbera, Woodbridge (CA); Nathaniel Ian Joos, Toronto (CA); Paolo Forte, Maple (CA); Andrew Hill, Scarborough (CA)

(73) Assignee: HYDROGENICS CORPORATION, Mississauga (CA)

( * ) Notice: Subject to any disclaimer, the term of this patent is extended or adjusted under 35 U.S.C. 154(b) by 628 days.

(21) Appl. No.: 17/955,342

(22) Filed: Sep. 28, 2022

(65) Prior Publication Data

US 2023/0101923 A1 Mar. 30, 2023

Related U.S. Application Data

(60) Provisional application No. 63/250,611, filed on Sep. 30, 2021.

(51) Int. Cl.
| | |
|---|---|
| *H01M 8/04223* | (2016.01) |
| *H01M 8/04007* | (2016.01) |
| *H01M 8/04029* | (2016.01) |
| *H01M 8/04302* | (2016.01) |
| *H01M 8/04701* | (2016.01) |
| *H01M 8/04746* | (2016.01) |
| *H01M 8/2465* | (2016.01) |

(52) U.S. Cl.
CPC ... *H01M 8/04268* (2013.01); *H01M 8/04029* (2013.01); *H01M 8/04067* (2013.01); *H01M 8/04253* (2013.01); *H01M 8/04302* (2016.02); *H01M 8/04723* (2013.01); *H01M 8/04768* (2013.01); *H01M 8/2465* (2013.01)

(58) Field of Classification Search
None
See application file for complete search history.

(56) References Cited

U.S. PATENT DOCUMENTS

| | | | |
|---|---|---|---|
| 7,179,554 B2 | 2/2007 | Ballantine et al. | |
| 8,313,871 B2 | 11/2012 | Wexel et al. | |
| 8,841,040 B2 | 9/2014 | Limbeck | |
| 9,034,532 B2 | 5/2015 | Sung et al. | |
| 10,439,236 B2 | 10/2019 | Han et al. | |
| 2007/0224462 A1 | 9/2007 | Limbeck | |
| 2020/0099067 A1 | 3/2020 | Yoshitomi | |

FOREIGN PATENT DOCUMENTS

| | | |
|---|---|---|
| CN | 111600049 | 8/2020 |
| CN | 109888332 | 9/2020 |
| DE | 102017211307 | 1/2019 |
| JP | 2012142300 | 7/2012 |
| WO | 2020/188256 | 9/2020 |

*Primary Examiner* — Jonathan Crepeau
(74) *Attorney, Agent, or Firm* — Barnes & Thornburg LLP

(57) ABSTRACT

The present disclosure relates to systems and methods for heating a fuel cell module.

20 Claims, 7 Drawing Sheets

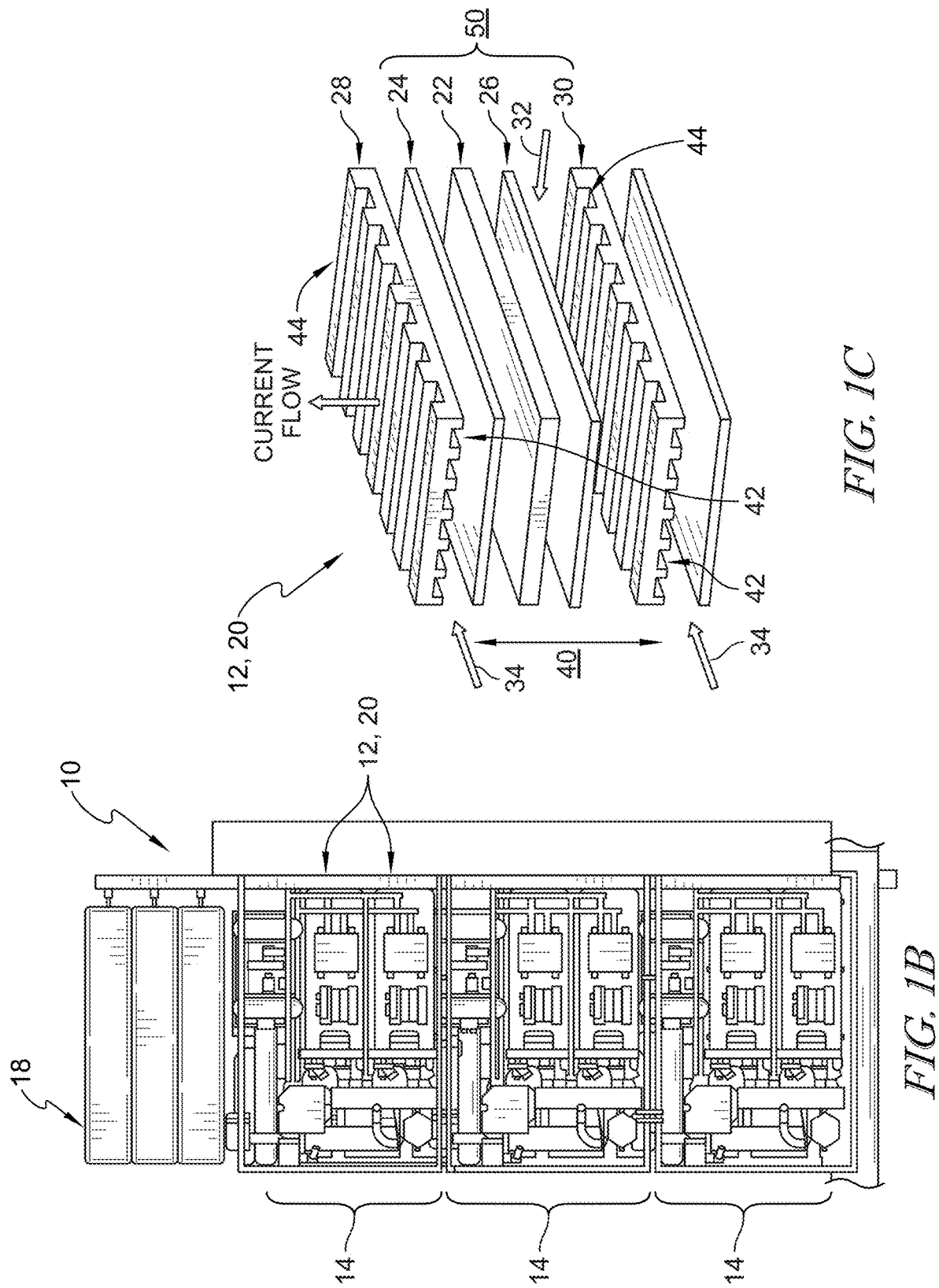

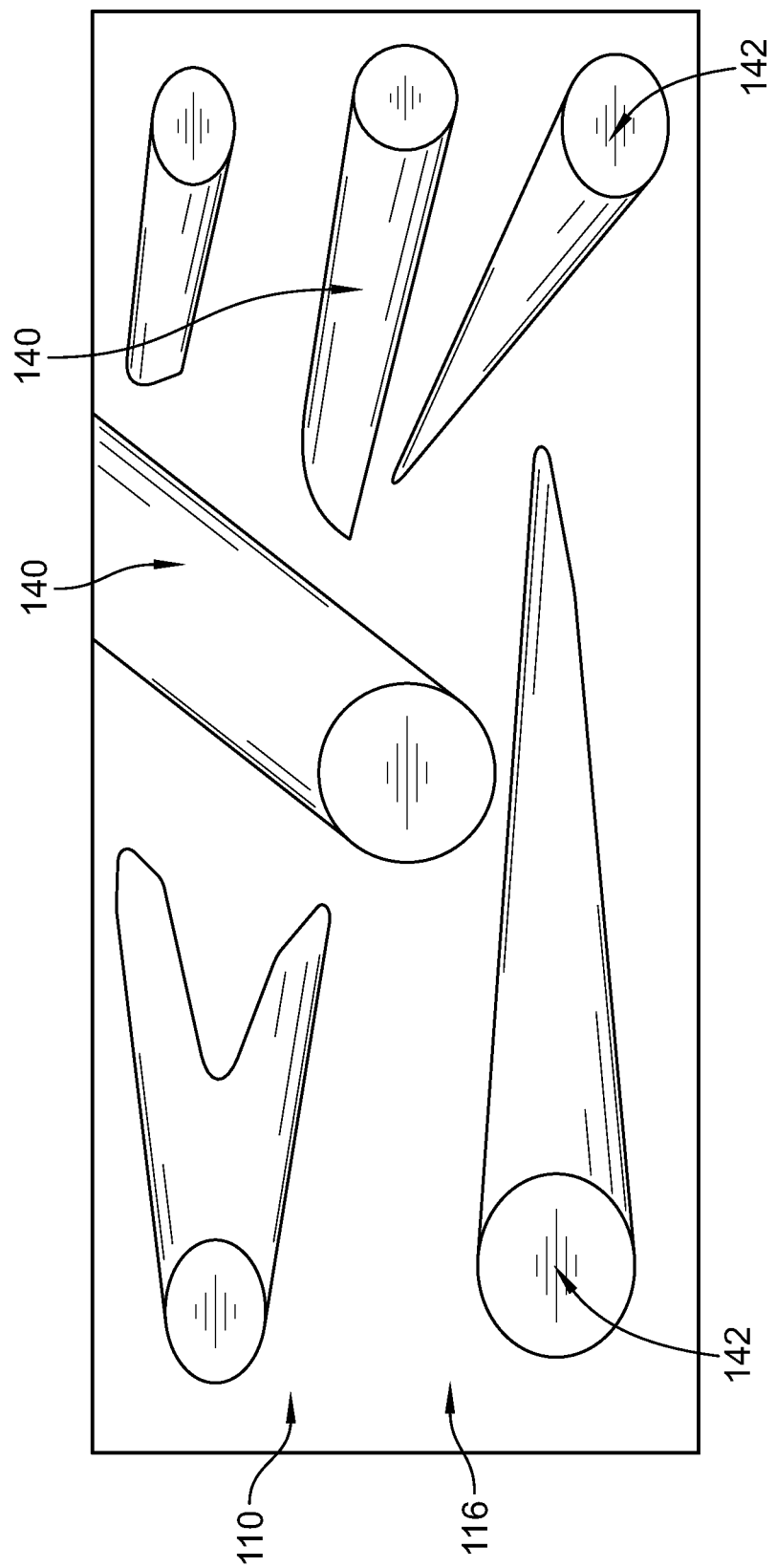

SYSTEMS AND METHODS FOR LIQUID HEATING BALANCE OF PLANT COMPONENTS OF A FUEL CELL MODULE

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/250,611 filed on Sep. 30, 2021, the entire disclosure of which is hereby expressly incorporated herein by reference.

TECHNICAL FIELD

The present disclosure relates to systems and methods for heating a fuel cell module, and more specifically, relates to heating existing liquid coolant and routing such heated coolant through the fuel cell module to raise a temperature thereof such that the fuel cell module can start from freezing, sub-zero conditions.

BACKGROUND

Fuel cell systems are known for their efficient use of fuel to develop direct current (DC) and/or alternating current (AC) electric power for stationary or mobile applications. Rising worldwide energy demands and climate control mechanisms have exponentially increased the popularity and demand for using fuel cells for power generation. This has resulted in year-round use of fuel cells in various climates and ambient environments around the globe, which may range from hot, desert conditions to freezing, arctic environments.

When fuel cells are operated in sub-zero environments during the winter months, water, which is created as a byproduct of the electrochemical reaction occurring in the fuel cell, can freeze. This is cause for concern. For example, during or after fuel cell operation, standing water accumulates at the fuel cell outlet. With sufficient downtime post-operation, the water can freeze to become ice, which can damage fuel cell components if the ice is not sufficiently thawed prior to powering on the fuel cell.

The present disclosure is related to systems and methods for heating a fuel cell module. In particular, the present disclosure is directed to a system, apparatus, and method of heating liquid coolant. The present disclosure is also directed to a method of routing the coolant through the fuel cell module to raise the temperature of the fuel cell module allowing it to start and functionally operate from freezing, sub-zero conditions.

SUMMARY

Embodiments of the present disclosure are included to meet these and other needs.

In one aspect of the present disclosure, described herein, a system or apparatus for heating a fuel cell module includes a fuel cell module having at least one inlet and at least one outlet, an endplate having one or more balance of plant components associated therewith and at least one channel running through the fuel cell module. This channel is in fluid communication with the at least one inlet and the at least one outlet to flow a liquid therethrough. The system also includes a heating element in communication with the at least one channel to heat the liquid flowing through the channel and the one or more balance of plant components.

In some embodiments, one or more balance of plant components may be formed on an external surface of the endplate. One or more channels are formed along an opposite, internal surface of the endplate. In some embodiments, one or more channels may be positioned such that a region of the internal surface of the endplate adjacent to the one or more channels is opposite of a region of the external surface of the endplate along which the balance of plant components are formed.

In some embodiments, one or more balance of plant components may be mounted or integratedly attached to the endplate. In some embodiments, one or more channels may have a diameter approximately in the range of about 5 millimeters to about 15 millimeters. In some embodiments, one or more channels may be etched into the internal surface of the endplate. In some embodiments, the heating element may be internally disposed within the fuel cell module. In some embodiments, the fuel cell module may be devoid of heating pads. In some embodiments, the heating element may be any of disposed in, around, or along the one or more channels. In some embodiments, at least one channel may terminate in an opening that is in fluid communication with the one or more balance of plant components.

A second aspect of the present disclosure relates to a method of heating a fuel cell module. The method includes the steps of flowing a fluid through one or more channels in a fuel cell module to change a temperature of one or more balance of plant components of the fuel cell module to a first temperature and heating the fluid to a second temperature through the one or more channels to raise the temperature of one or more balance of plant components of the fuel cell module.

In some embodiments, flowing the fluid through the one or more channels may further include routing the fluid to a location adjacent to an outer surface of the one or more balance of plant components. In some embodiments, one or more channels may be internally disposed within the fuel cell module. In some embodiments, one or more channels may be disposed adjacent to an endplate of the fuel cell module to which the balance of plant components are coupled. In some embodiments, heating the fluid to a second temperature may further include activating a heating element disposed within the fuel cell module to heat the fluid. In some embodiments, the heating element may be disposed in, around, or along the one or more channels. In some embodiments, the method may further include diverting the fluid at the second temperature through channels of the one or more channels to bring the balance of plant components adjacent to said channels to a temperature threshold. In some embodiments, the fluid may be diverted independent of a location of the heating element used to heat the fluid.

BRIEF DESCRIPTION OF THE DRAWINGS

FIG. 1B is a cutaway view of an exemplary fuel cell system including an air delivery system, an electrolyzer and a plurality of fuel cell modules each including multiple fuel cell stacks;

FIG. 1C is a perspective view of an exemplary repeating unit of a fuel cell stack of the fuel cell system of FIG. 1A;

FIG. 5 is a schematic view of an endplate of the fuel cell module of FIG. 2 having a series of channels formed therein.

These and other features, aspects, and advantages of the present embodiments will become better understood when the following detailed description is read with reference to the accompanying drawings described herein.

DETAILED DESCRIPTION

Figure 1A:
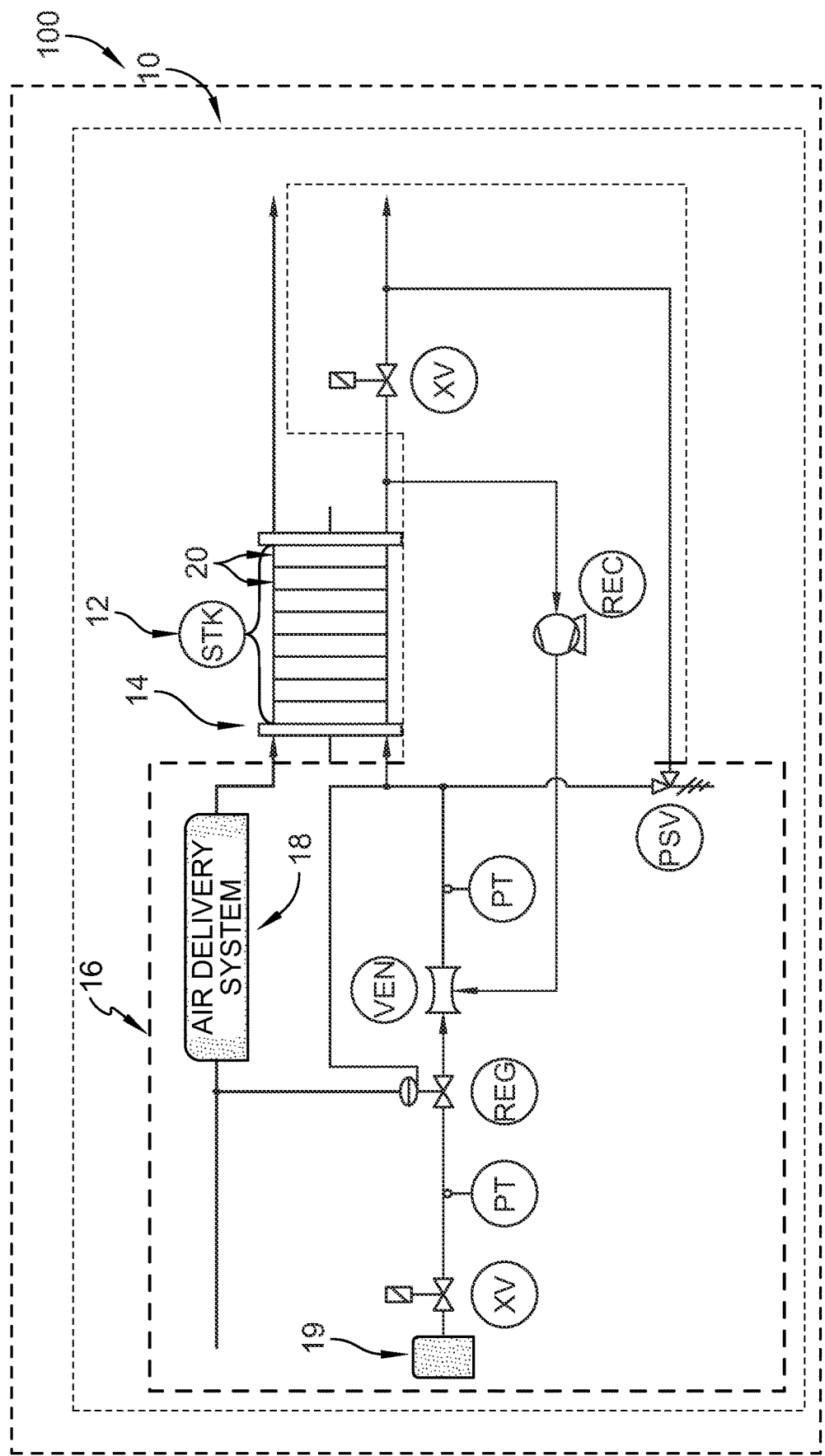
FIG. 1A is a schematic view of an exemplary fuel cell system including an air delivery system, an electrolyzer and a fuel cell module including a stack of multiple fuel cells.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
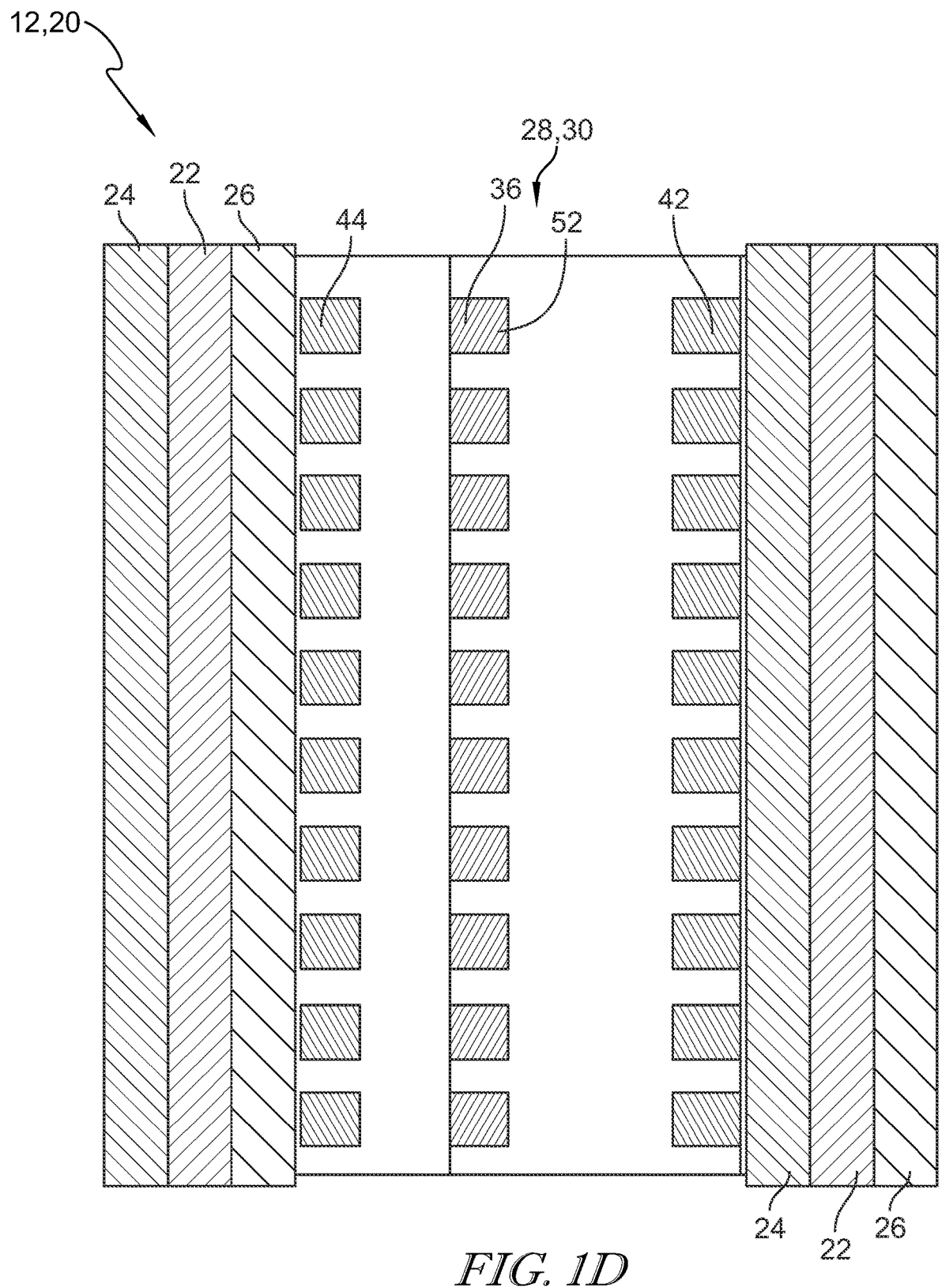
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with electrolyzers 19 and/or other electrolysis system 19. In one embodiment, the fuel cell system 10 is connected and/or attached in series or parallel to an electrolysis system 19, such as one or more electrolyzers 19 in the BOP 16 (see FIG. 1A). In another embodiment, the fuel cell system 10 is not connected and/or attached in series or parallel to an electrolysis system 19, such as one or more electrolyzers 19 in the BOP 16.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims.

The features illustrated or described in connection with one exemplary embodiment may be combined with the features of other embodiments. Such modifications and variations are intended to be included within the scope of the present disclosure. Further, a person skilled in the art will recognize that terms commonly known to those skilled in the art may be used interchangeably herein. For example, the terms "fuel cell stack," "fuel cell," and "fuel cell module" can be used interchangeably to refer to the fuel cell module 14 having the BOP components 16 mounted or otherwise associated with the fuel cell module 14. Moreover, the terms "fluid" and "liquid" can be used interchangeably to refer to the coolant 36 substance flowing through the cooling channel of the fuel cell module 14 of the present disclosure. Alternatively, a fluid may also refer to compositions that are not liquid, such as gases or solids.

The present disclosure is directed to systems and methods for heating a fuel cell module 14 and its associated BOP components 16 using already existing materials and structures within the fuel cell module 14. For example, fuel cell operation may include heating a fluid, such as a coolant. An exemplary coolant is a liquid coolant 36.

Coolant, such as liquid coolant flowing through the fuel cell module 14 can raise the temperature of the fuel cell module 14 such that the fuel cell module can be powered on (e.g., turned on) in a variety of ambient environments, including freezing or sub-zero conditions. The fuel cell module 14 may be heated using one or more heating elements added to an existing cooling loop (also referred to as a cooling channel) 130 to heat the circulating liquid coolant 36 (e.g., circulating therethrough).

Balance of Plant (BOP) components 16 may be mounted or otherwise associated or configured to be connected with the fuel cell module 14. Doing so helps to promote substantially simultaneous heating of the liquid coolant 36 and the BOP components 16, particularly as heated coolant 36 circulates through the fuel cell module 14. One or more channels 130 may be positioned internally within the fuel cell module 14 to route the heated coolant 36 towards the mounted BOP components 16 in order to heat the fuel cell module 14.

Figure 2:
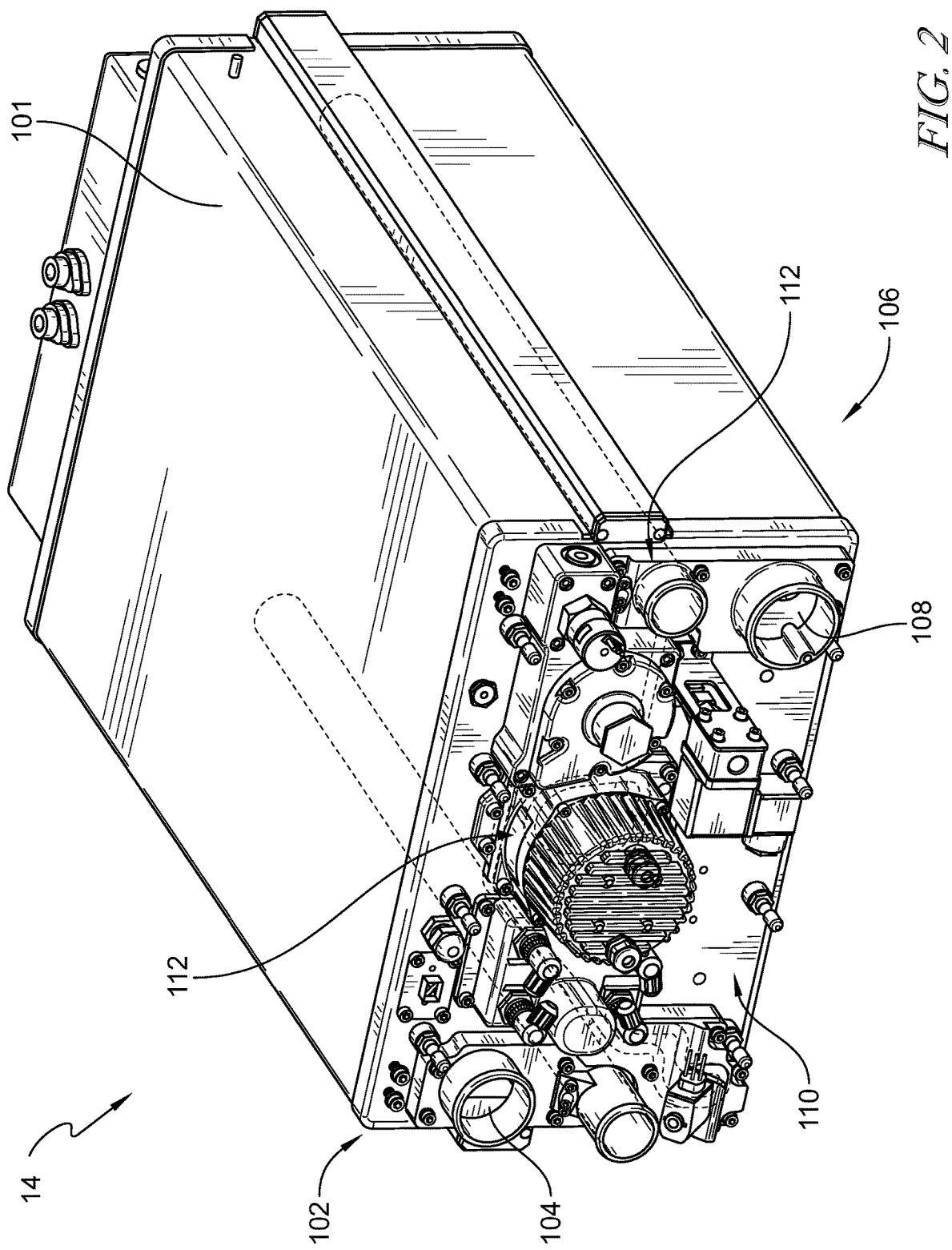
FIG. 2 is a schematic perspective view of an exemplary embodiment of a fuel cell module of the present disclosure having internal channels and balance of plant components mounted thereon.

FIG. 2 illustrates an exemplary embodiment of a fuel cell module 14 of the present disclosure that is configured to generate electricity, heat, and/or water. As shown, the fuel cell module 14 may include a housing 101 that encases an anode 102 having an inlet 104 and an outlet, along with a cathode 106 having an outlet 108 and an inlet. Hydrogen atoms (not shown) enter the anode inlet 104 where the atoms are stripped of their electrons and the protons are passed to the cathode 106 through the membrane electrode assembly 22. The electrons pass through a circuit to generate electricity and are then combined with the protons and oxygen in the air at the cathode 106. During this electrochemical process, byproducts, such as water and heat, are generated as discussed above.

The fuel cell module 14 may include an endplate 110. The endplate 110 may be disposed on one end of the housing 101 of the fuel cell module 14 to enclose the internal components of the fuel cell module 14. The endplate 110 may be positioned on a distal face of the housing 101. In some embodiments, the endplate 110 may be positioned on another of the multiple faces of the housing 101.

In some embodiments, the endplate 110 may include a plurality of openings 112 for receiving additional fuel cell module 14 parts therein. For example, the endplate 110 may include a plurality of recesses or openings 112 configured to receive the inlet 104 and the outlet 108 of the fuel cell module 14. Additional openings for wiring, sensors, piping, tubing, and other components may be dispersed across the surface of the endplate 110.

The endplate 110 may be manufactured from a metallic material, such as aluminum, nickel, stainless steel, ceramic, or plastic or combinations thereof. The endplate 110 may be removably coupled to the endplate 110 to allow modification of the fuel cell module 14. Modification of the fuel cell module 14 may be by reorienting the endplate 110 onto the fuel cell module 14 and/or replacing an endplate 110 of the fuel cell module 14 with another endplate 110 having a different configuration, as further discussed below.

Figure 3:
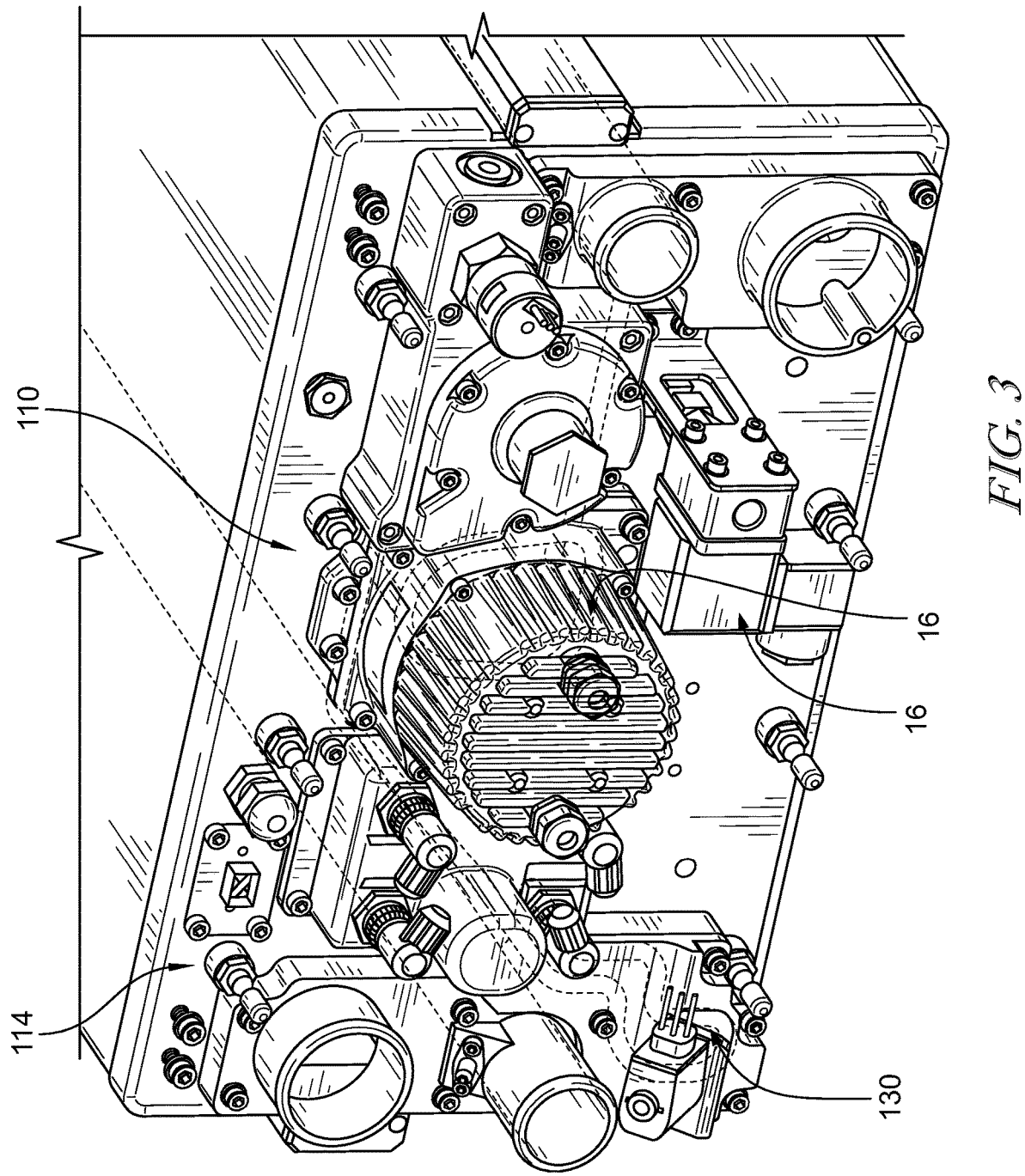
FIG. 3 is an enlarged schematic perspective view of the fuel cell module of FIG. 2.

FIG. 3 illustrates the endplate 110 in greater detail. For example, the endplate 110 may include one or more balance of plant ("BOP") components 16 that is mounted onto an external or outer surface 114 of the endplate 110. In some embodiments, the BOP components 16 may be integrally attached, glued, or etched into a surface of the endplate 110.

The arrangement of the BOP components 16 shown on the endplate 110 of FIG. 3 is merely exemplary and the arrangement of the BOP components 16 on the endplate 110 may be arranged in a variety of configurations. Some non-limiting examples of BOP components 16 include pumps, valves, sensors, fittings, power transformers, piping, and such that are configured to a fuel cell module 14 in order to be a useful power generation source. During operation, the BOP components 16 may experience long-term exposure to hydrogen, air, high-purity water, heat, chemicals, and ambient environmental conditions that may deteriorate the condition of the BOP components 16.

Moreover, as discussed above, the water byproduct generated by the fuel cell module 14 can freeze, further damaging the BOP components 16 when the fuel cell is started in sub-zero conditions. Mounting the BOP components 16 onto the endplate 110 can create compact fuel cell modules 14 that benefit from heat dissipation through the metal endplate 110 to more quickly heat the BOP components 16 mounted thereto. Having the BOP components 16 mounted thereto can thereby reduce costs of heating as well as shipping of the fuel cell modules 14 as the BOP components 16 can be packaged with the fuel cell module 14 as a single entity.

The fuel cell module 14 may include a cooling channel 130 formed therein. The cooling channel 130 may be configured to deliver a fluid, such as a liquid coolant 36, throughout the fuel cell module 14 to lower the temperature of the fuel cell module 14. As shown, the cooling channel 130 may run internally within the fuel cell module 14, though, in some embodiments, a portion or an entirety of the cooling channel 130 may be positioned external to the fuel cell module 14.

Figure 4:
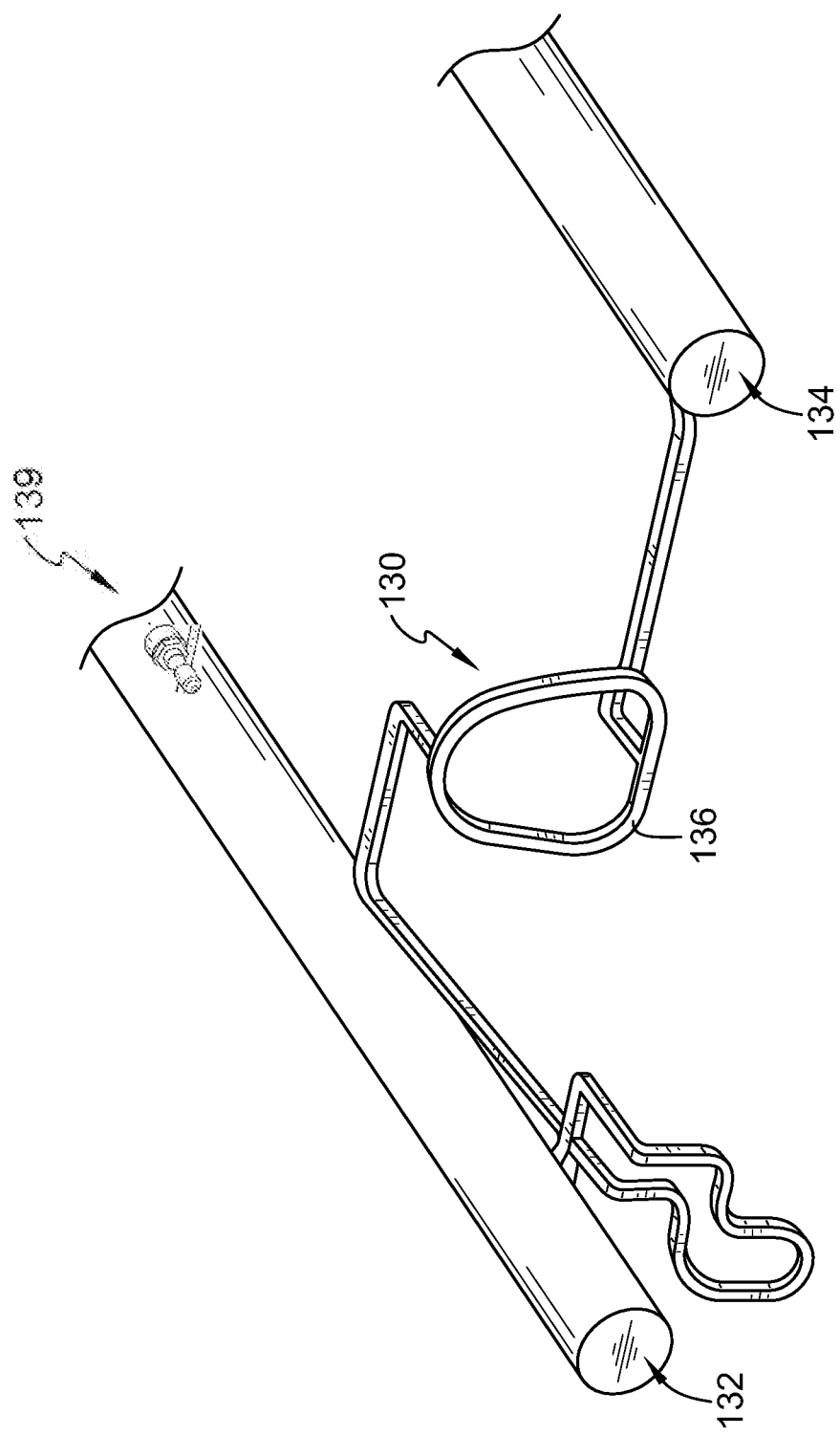
FIG. 4 is a schematic perspective view of the internal channels of the fuel cell module of FIG. 2.

FIG. 4 illustrates a detailed view of the cooling channel 130. As shown, the cooling channel 130 may extend between a coolant inlet 132 and a coolant outlet 134. The coolant inlet 132 may be configured to receive the liquid coolant 36 therein, with the liquid coolant 36 exiting the coolant outlet 134. In some embodiments, the cooling channel 130 may extend through the fuel cell module 14 such that the liquid coolant 36 flows adjacent to one or more of the BOP components 16 to cool the BOP components 16.

In some embodiments, a shape and/or orientation of the cooling channel 130 that extends between the coolant inlet 132 and the coolant outlet 134 may vary. For example, the cooling channel 130 may include one or more bends or twists formed therein between the coolant inlet 132 and the coolant outlet 134. The location of the bends or twists may depend on a location of the one or more BOP components 16 mounted on the endplate 110 at a location adjacent to the cooling channel 130. For example, the cooling channel 130 may include a circumferential portion 136 section that can surround a hydrogen recirculation pump [122] of the BOP components 16 to deliver coolant across a perimeter of the hydrogen recirculation pump.

In some embodiments, a shape and/or orientation of the cooling channel 130 that extends between the coolant inlet 132 and the coolant outlet 134 may vary. For example, the cooling channel 130 may include one or more bends or twists formed therein between the coolant inlet 132 and the coolant outlet 134. The location of the bends or twists may depend on a location of the one or more BOP components 16 mounted on the endplate 110 at a location adjacent to the cooling channel 130. For example, the cooling channel 130 may include a circumferential portion 136 section that can surround a hydrogen recirculation pump 122 of the BOP components 16 to deliver coolant across a perimeter of the hydrogen recirculation pump 122.

In some embodiments, a size of the cooling channel 130 may vary. For example, the cooling channel 130 may have a diameter approximately in a range of about 5 millimeters to about 15 millimeters, including any specific diameter or range of diameters comprised therein. The cooling channel 130 may be positioned such that the liquid coolant 36 running therethrough travels behind the endplate 110. As shown in FIG. 3, the cooling channel 130 may extend adjacent to a region of an inner or internal surface 116 of the endplate 110 that is opposite of a region along which the BOP components 16 are mounted to the outer or external 114 surface of the endplate 110.

As mentioned above, the cooling channel 130 may be used to increase a temperature or heat of the fuel cell module 14 and/or one or more of the BOP components 16. A person skilled in the art will recognize that during operation, the fuel cell module 14 creates sufficient heat to prevent water in the fuel cell module 14 from freezing. On the contrary, when the fuel cell module 14 is started up from a cold or freezing condition, the fuel cell module 14 should be brought up to a temperature above the freezing point to ensure that there is no ice either internally or in the balance of plant (BOP) components 16 that can cause a malfunction, degradation, and/or damage.

In light of the above, in some embodiments, the fuel cell module 14 may include a heating element 139 or source therein for heating the liquid coolant 36. The heated coolant 36 may then be circulated via the cooling channel 130 to heat the fuel cell module 14 and the BOP components 16 mounted thereto. In some embodiments, the heating element 139 may be disposed in, around, or along the cooling channel 130 to raise the temperature of the liquid coolant 36 flowing therethrough.

Some non-limiting examples of the heating element 139 may include a heating coil, a furnace, or a resistive heating element 139. In some embodiments, to start the fuel cell module 14 from freezing conditions, the heating element 139 may raise the temperature of the coolant 36 such that a temperature of the BOP components 16 to which the coolant 36 is delivered is slightly above freezing, e.g., approximately 5 degrees Celsius. A person skilled in the art will recognize that the temperature of the heated coolant 36 used to raise the temperature of the BOP components 16 to approximately 5 degrees Celsius (5° C.) may depend on the rest of the cooling system external to the fuel cell module 14 and/or the associated thermal losses.

Circulating heated coolant 36 through an existing coolant loop 130, as described herein, provides a simpler, more passive solution to heating the fuel cell module 14 as compared to conventional methods. For example, the fuel cell module 14 and the BOP components 16 may be heated using a single heating element 139. It will also be appreciated that in some embodiments, a plurality, e.g., two or more, of heating elements 139 may be used. Moreover, in some embodiments, heated coolant 36 may be diverted throughout the fuel cell module 14 independent of a location of the heating element 139 used to heat the fluid.

Circulating heated coolant 36 through the existing coolant loop 130, as described herein, can also be more efficient as heated internal coolant 36 flow can be selectively applied to specific components for heating as opposed to externally mounted heating pads, which may need additional insulation to prevent heat loss to the ambient environment. For example, flow of heated coolant 36 can raise the temperature of the BOP components 16 and/or the fuel cell module 14 faster, e.g., approximately in a range of about one minute to about three hours, or approximately in a range of about three minutes to about two hours, and/or approximately in a range of about five minutes to about one hour, including any specific times or ranges of time comprised therein. The increase in temperature can melt ice that forms on the BOP components 16, e.g., the hydrogen recirculation pump, as a result of water and/or moisture build up after fuel cell module 14 operation in sub-zero conditions.

In some embodiments, the endplate 110 may include one or more channels 140 formed therein to divert the heated liquid coolant adjacent to inlets 104 and/or outlets 108 of individual BOP components 16 for heating. The fluid channels 140 can be internal channels formed on an underside or internally, within the endplate 110 to provide heating to specific regions of the endplate 110 and/or the BOP components 16. FIG. 4 illustrates these channels 140 in greater detail.

As shown, the channels 140 may be customized and oriented on the internal surface 116 of the endplate 110 to provide appropriate amounts of heated liquid coolant 36 to the BOP components 16 for heating. As noted above, flowing the heated liquid coolant 36 through the channels 140 may, in some embodiments, negate the need for heating pads, wires, and/or additional componentry as the channels 140 may provide heated coolant 36 in proximity to fuel cell components to raise their temperature to a threshold (e.g., a temperature threshold) that may be defined by a desired temperature necessary to start the fuel cell module 14 from freezing, sub-zero conditions. The temperature threshold and/or the desired temperature may be any temperature at which the fuel cell system 10 will start, particularly when the fuel cell system is in freezing and/or sub-zero environmental conditions.

A size of the channels 140 can range from about 5 millimeters to about 15 millimeters, including any specific or range of size comprised therein. It will be appreciated that the size and/or location of the channels 140 may vary based on a distribution of the BOP components 16 located on the opposite surface of the endplate 110 such that the channels 140 run adjacent to the location of the BOP components 16. It will also be appreciated that in some embodiments, the channels 140 may be any shape, such as particularly rectangular-shaped.

In some embodiments, the channels 140 may be etched, carved, or otherwise entrenched within the endplate 110. In some embodiments, the fuel cell module 14 may include a layer of isolation, or an isolator, disposed between the channels 140 and the endplate 110 to electrically separate the liquid from the endplate 110. For example, for embodiments of the fuel cell module 14 having a metallic endplate 110, the isolator may be disposed between the endplate 110 and the fluid flow paths or channels 140. It will be appreciated in embodiments in which a plastic endplate 110 is used that the isolator may be removed such that the fluid flow paths interface, touch, and/or interact directly with the endplate 110.

The channels 140 may begin and/or terminate in openings 142 in the endplate 110 that allow the heated coolant 36 to flow through the openings 142. In some embodiments, the openings 142 may be positioned on the internal surface 116 of the endplate 110 that is opposite of one or more BOP components 16 to allow the heated coolant to flow adjacent to the BOP components 16. In some embodiments, the openings 142 may be in fluid communication with the BOP components 16 to allow the heated coolant interface with a larger surface area of the BOP component to promote faster heating.

The following described aspects of the present invention are contemplated and non-limiting:

A first aspect of the present invention relates to a system for heating a fuel cell module including a fuel cell module having at least one inlet and at least one outlet, an endplate having one or more balance of plant components associated therewith and at least one channel running through the fuel cell module. The channel is in fluid communication with the at least one inlet and the at least one outlet to flow a liquid there through. The system also includes a heating element 139 in communication with the at least one channel to heat the liquid flowing through the channel and the one or more balance of plant components.

A second aspect of the present invention relates to a method of heating a fuel cell module. The method includes the steps of flowing a fluid through one or more channels in a fuel cell module to change a temperature of one or more balance of plant components of the fuel cell module to a first temperature and heating the fluid to a second temperature through the one or more channels to raise the temperature of one or more balance of plant components of the fuel cell module.

In the first aspect of the present invention, one or more balance of plant components may be formed on an external surface of the endplate. One or more channels are formed along and opposite the internal surface of the endplate. In the first aspect of the present invention, one or more channels may be positioned such that a region of the internal surface of the endplate adjacent to the one or more channels is opposite of a region of the external surface of the endplate along which the balance of plant components are formed.

In the first aspect of the present invention, one or more balance of plant components may be mounted or integratedly attached to the endplate. In the first aspect of the present invention, one or more channels may have a diameter approximately in the range of about 5 millimeters to about 15 millimeters. In the first aspect of the present invention, one or more channels may be etched into the internal surface of the endplate.

In the first aspect of the present invention, the heating element may be internally disposed within the fuel cell module. In the first aspect of the present invention, the fuel cell module may be devoid of heating pads. In the first aspect of the present invention, the heating element may be any of disposed in, around, or along the one or more channels. In the first aspect of the present invention, at least one channel may terminate in an opening that is in fluid communication with the one or more balance of plant components.

In the second aspect of the present invention, flowing the fluid through the one or more channels may further include routing the fluid to a location adjacent to an outer surface of the one or more balance of plant components. In the second aspect of the present invention, one or more channels may be internally disposed within the fuel cell module. In the second aspect of the present invention, one or more channels may be disposed adjacent to an endplate of the fuel cell module to which the balance of plant components are coupled. In the second aspect of the present invention, heating the fluid to a second temperature may further include activating a heating element disposed within the fuel cell module to heat the fluid.

In the second aspect of the present invention, the heating element may be disposed in, around, or along the one or more channels. In the second aspect of the present invention, the method may further include diverting the fluid at the second temperature through one or more channels to bring the balance of plant components adjacent of said channels to a temperature threshold. In the second aspect of the present invention, the fluid may be diverted independent of a location of the heating element used to heat the fluid.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

The above embodiments are described in sufficient detail to enable those skilled in the art to practice what is claimed and it is to be understood that other embodiments may be utilized and that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third," and the like, as used herein do not denote any order or importance, but rather are used to distinguish one element from another. The term "or" and "and/or" is meant to be inclusive and mean either, all, or any combination of the listed items. In addition, the terms "connected" and "coupled" are not restricted to physical or mechanical connections or couplings, and may include electrical connections or couplings, whether direct or indirect. Direct connection and/or coupling may include such connections and/or couplings where no intermittent connection or component is present between two endpoints, components or items. Indirect connection and/or coupling may include where there is one or more intermittent or intervening connections and/or couplings present between respective endpoints, components or items.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The phrase "consisting of" or "consists of" refers to a compound, composition, formulation, or method that excludes the presence of any additional elements, components, or method steps.

The term "consisting of" also refers to a compound, composition, formulation, or method of the present disclosure that excludes the presence of any additional elements, components, or method steps. The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system for heating a fuel cell module, comprising:
    the fuel cell module having at least one inlet and at least one outlet;
    an endplate;
    one or more balance of plant components coupled to the endplate;
    at least one channel running through the fuel cell module, the at least one channel being in fluid communication with the at least one inlet and the at least one outlet to flow a liquid therethrough, the at least one channel being formed to include a circumferential loop configured to surround a perimeter of at least one of the one or more balance of plant components located adjacent to the at least one channel; and
    a heating element in communication with the at least one channel to heat the liquid flowing through the at least one channel, the heated liquid configured to heat the one or more balance of plant components as the heated liquid flows through the at least one channel.

2. The system of claim 1, wherein the one or more balance of plant components are formed on an external surface of the endplate, and the at least one channel is formed along an opposite, internal surface of the endplate.

3. The system of claim 2, wherein the at least one channel is positioned such that a region of the internal surface of the endplate adjacent to the at least one channel is opposite of a region of the external surface of the endplate along which the balance of plant components are formed.

4. The system of claim 1, wherein the one or more balance of plant components are mounted or integratedly attached to the endplate.

5. The system of claim 1, wherein an orientation of the at least one channel depends on a location of the one or more balance of plant components mounted on the endplate.

6. The system of claim 1, wherein the at least one channel has a diameter ranging from about 5 millimeters to about 15 millimeters.

7. The system of claim 2, wherein the at least one channel is etched into the internal surface of the endplate.

8. The system of claim 1, wherein the heating element is internally disposed within the fuel cell module.

9. The system of claim 1, wherein the fuel cell module is devoid of heating pads.

10. The system of claim 1, wherein the heating element is disposed in, around, or along the at least one channel.

11. The system of claim 1, wherein the at least one channel terminates in an opening that is in fluid communication with the one or more balance of plant components.

12. A method of heating a fuel cell module, the method comprising:
    flowing a fluid through one or more channels in a fuel cell module to change a temperature of one or more balance of plant components of the fuel cell module to a first temperature;
    heating the fluid to a second temperature via a heating element in communication with the one or more channels, the second temperature being higher than the first temperature; and
    selectively flowing the fluid at the second temperature through the one or more channels to raise the temperature of the one or more balance of plant components of the fuel cell module to the second temperature,
    wherein the one or more balance of plant components is coupled to an endplate, and wherein the one or more channels is formed to include a circumferential loop configured to surround a perimeter of at least one of the one or more balance of plant components located adjacent to the one or more channels.

13. The method of claim 12, wherein flowing the fluid through the one or more channels further comprises routing the fluid to a location adjacent to an outer surface of the one or more balance of plant components.

14. The method of claim 12, wherein the one or more channels are internally disposed within the fuel cell module.

15. The method of claim 12, wherein the one or more channels are disposed adjacent to the endplate of the fuel cell module to which the balance of plant components are coupled.

16. The method of claim 12, wherein heating the fluid to the second temperature further comprises activating the heating element disposed within the fuel cell module to heat the fluid.

17. The method of claim 12, wherein the fuel cell module is devoid of heating pads.

18. The method of claim 12, further comprising diverting the fluid at the second temperature through channels of the one or more channels to bring the one or more balance of plant components adjacent to said channels to a desired temperature.

19. The method of claim 18, wherein the fluid is diverted independent of a location of the heating element used to heat the fluid.

20. The system of claim 1, wherein the one or more balance of plant components includes a hydrogen recirculation pump.

* * * * *